US011669607B2

(12) United States Patent
Vorobiev et al.

(10) Patent No.: US 11,669,607 B2
(45) Date of Patent: Jun. 6, 2023

(54) ID VERIFICATION WITH A MOBILE DEVICE

(71) Applicant: PXL Vision AG, Zurich (CH)

(72) Inventors: Mikhail Vorobiev, Zurich (CH); Nevena Shamoska, Zürich (CH); Magdalena Polac, Zürich (CH); Benjamin Fankhauser, Biel-Bienne (CH); Michael Goettlicher, Biel-Bienne (CH); Marcus Hudritsch, Biel-Bienne (CH); Suman Saha, Zurich (CH); Stamatios Georgoulis, Zurich (CH); Luc van Gool, Zurich (CH)

(73) Assignee: PXL Vision AG, Zurich (CH)

( * ) Notice: Subject to any disclaimer, the term of this patent is extended or adjusted under 35 U.S.C. 154(b) by 278 days.

(21) Appl. No.: 17/006,188

(22) Filed: Aug. 28, 2020

(65) Prior Publication Data

US 2021/0064900 A1    Mar. 4, 2021

Related U.S. Application Data

(60) Provisional application No. 62/893,556, filed on Aug. 29, 2019.

(51) Int. Cl.
*G06V 40/00*     (2022.01)
*G06V 40/40*     (2022.01)
(Continued)

(52) U.S. Cl.
CPC ............. *G06V 40/45* (2022.01); *B42D 25/23* (2014.10); *B42D 25/328* (2014.10);
(Continued)

(58) Field of Classification Search
CPC ...... G06V 40/45; G06V 10/25; G06V 10/751; G06V 30/413; G06V 40/168;
(Continued)

(56) References Cited

U.S. PATENT DOCUMENTS

| 4,765,656 A | 8/1988 | Becker et al. |
| 7,672,475 B2 | 3/2010 | O'Doherty et al. |

(Continued)

FOREIGN PATENT DOCUMENTS

| AU | 2017100646 A4 | 7/2017 |
| CN | 105205455 A | 12/2015 |

(Continued)

OTHER PUBLICATIONS

Invitation to Pay Additional Fees mailed Dec. 18, 2020 in connection with International Application No. PCT/IB2020/000703.

(Continued)

*Primary Examiner* — Neil R McLean
(74) *Attorney, Agent, or Firm* — Wolf, Greenfield & Sacks, P.C.

(57) ABSTRACT

A system for remote identification of users. The system uses deep learning techniques for authenticating a user from an identification document and using automated verification of identification documents. Identification documents may be authenticated by validating security features. The system may determine features expected in a valid identification document and determine whether those features are present, employing techniques, such as determining whether direction-sensitive features are present. Liveness of a user indicated by the identification document may be determined with a deep learning model trained for identification of facial spoofing attacks.

26 Claims, 12 Drawing Sheets

(51) Int. Cl.
- *B42D 25/23* (2014.01)
- *B42D 25/328* (2014.01)
- *G06N 3/08* (2023.01)
- *G06V 10/25* (2022.01)
- *G06V 10/75* (2022.01)
- *G06V 30/413* (2022.01)
- *G06V 40/60* (2022.01)
- *G06V 40/16* (2022.01)
- *G06F 18/214* (2023.01)

(52) U.S. Cl.
CPC ............. *G06F 18/214* (2023.01); *G06N 3/08* (2013.01); *G06V 10/25* (2022.01); *G06V 10/751* (2022.01); *G06V 30/413* (2022.01); *G06V 40/168* (2022.01); *G06V 40/172* (2022.01); *G06V 40/67* (2022.01)

(58) Field of Classification Search
CPC ...... G06V 40/172; G06V 40/67; G06V 10/16; G06V 10/225; B42D 25/23; B42D 25/328; G06K 9/6256; G06N 3/08; G06F 21/34; G06F 21/32; G07D 7/0032; G07D 7/12; G07D 7/206
USPC ........................................................ 382/306
See application file for complete search history.

(56) References Cited

U.S. PATENT DOCUMENTS

| | | |
|---|---|---|
| 7,925,096 B2 | 4/2011 | Baxter et al. |
| 9,305,230 B2 | 4/2016 | Abulafia et al. |
| 9,648,496 B2 | 5/2017 | Loughlin-Mchugh et al. |
| 9,785,764 B2 | 10/2017 | Loughlin-Mchugh et al. |
| 9,852,285 B2 | 12/2017 | Loughlin-Mchugh et al. |
| 9,858,408 B2 | 1/2018 | Loughlin-Mchugh et al. |
| 9,965,610 B2 | 5/2018 | Chandraker et al. |
| 10,210,321 B2 | 2/2019 | Loughlin-Mchugh et al. |
| 10,242,283 B1 | 3/2019 | Jain et al. |
| 10,289,822 B2 | 5/2019 | Chandraker et al. |
| 10,289,823 B2 | 5/2019 | Chandraker et al. |
| 10,289,824 B2 | 5/2019 | Chandraker et al. |
| 10,289,825 B2 | 5/2019 | Chandraker et al. |
| 11,170,084 B2 * | 11/2021 | Streit ..................... G06F 21/32 |
| 2003/0139994 A1 | 7/2003 | Jones |
| 2005/0129282 A1 | 6/2005 | O'Doherty et al. |
| 2008/0267514 A1 * | 10/2008 | Alasia .................... G07D 7/005 382/232 |
| 2009/0154778 A1 * | 6/2009 | Lei ..................... G06V 10/7715 382/112 |
| 2009/0154813 A1 | 6/2009 | Baxter et al. |
| 2012/0143760 A1 | 6/2012 | Abulafia et al. |
| 2012/0281077 A1 | 11/2012 | Canero Morales et al. |
| 2013/0188840 A1 | 7/2013 | Ma et al. |
| 2015/0078671 A1 | 3/2015 | van Deventer et al. |
| 2016/0292950 A1 * | 10/2016 | Czyzewski .......... G03H 1/2249 |
| 2017/0024576 A1 | 1/2017 | Kinsel et al. |
| 2017/0220886 A1 | 8/2017 | Canero Morales et al. |
| 2017/0255769 A1 | 9/2017 | Loughlin-Mchugh et al. |
| 2017/0345146 A1 | 11/2017 | Fan et al. |
| 2018/0005027 A1 * | 1/2018 | Touret ................. G06V 30/142 |
| 2018/0032828 A1 | 2/2018 | Wang et al. |
| 2018/0046852 A1 | 2/2018 | Ionita |
| 2018/0046871 A1 | 2/2018 | Ionita |
| 2018/0053041 A1 | 2/2018 | Chen |
| 2018/0091672 A1 * | 3/2018 | Aiello ................ H04N 1/00737 |
| 2018/0099521 A1 * | 4/2018 | Wu ...................... B42D 25/309 |
| 2018/0173980 A1 | 6/2018 | Fan et al. |
| 2018/0260643 A1 | 9/2018 | Sheikh Faridul et al. |
| 2018/0276488 A1 | 9/2018 | Yoo et al. |
| 2018/0293429 A1 | 10/2018 | Wechsler et al. |
| 2018/0349682 A1 | 12/2018 | Wong et al. |
| 2018/0357501 A1 | 12/2018 | Ma |
| 2019/0034610 A1 | 1/2019 | Miu |
| 2019/0034680 A1 * | 1/2019 | Rapoport ............. G06K 7/1098 |
| 2019/0347388 A1 | 11/2019 | Jiang et al. |
| 2020/0104471 A1 * | 4/2020 | Yang ..................... G06V 40/45 |
| 2021/0209387 A1 | 7/2021 | Nikitidis et al. |

FOREIGN PATENT DOCUMENTS

| | | |
|---|---|---|
| CN | 106228139 A | 12/2016 |
| CN | 106599863 A | 4/2017 |
| CN | 106599864 A | 4/2017 |
| CN | 106778684 A | 5/2017 |
| CN | 106874876 A | 6/2017 |
| CN | 107103281 A | 8/2017 |
| CN | 107122744 A | 9/2017 |
| CN | 107220635 A | 9/2017 |
| CN | 107292267 A | 10/2017 |
| CN | 107330383 A | 11/2017 |
| CN | 107480575 A | 12/2017 |
| CN | 107679501 A | 2/2018 |
| CN | 108021892 A | 5/2018 |
| CN | 108229325 A | 6/2018 |
| CN | 108229326 A | 6/2018 |
| CN | 108229328 A | 6/2018 |
| CN | 108229329 A | 6/2018 |
| CN | 108229331 A | 6/2018 |
| CN | 108256450 A | 7/2018 |
| CN | 108268845 A | 7/2018 |
| CN | 108304788 A | 7/2018 |
| CN | 108446689 A | 8/2018 |
| CN | 108846306 A | 11/2018 |
| CN | 108985200 A | 12/2018 |
| CN | 109409297 A | 3/2019 |
| CN | 109670430 A | 4/2019 |
| DE | 19809403 A1 | 2/1999 |
| DE | 19901881 A1 | 7/2000 |
| DE | 102004056007 A1 | 5/2006 |
| DE | 102005024661 A1 | 12/2006 |
| DE | 102013100635 A1 | 7/2014 |
| DE | 102013101587 A1 | 8/2014 |
| DE | 102013110785 A1 | 4/2015 |
| DE | 102014207439 A1 | 10/2015 |
| EP | 0 772 102 A2 | 5/1997 |
| EP | 1 152 592 A1 | 11/2001 |
| EP | 2 174 796 A1 | 4/2010 |
| EP | 2 239 145 A1 | 10/2010 |
| EP | 2 437 186 A1 | 4/2012 |
| EP | 2 546 782 A1 | 1/2013 |
| EP | 2 956 925 A1 | 12/2015 |
| EP | 2 948 891 B1 | 5/2016 |
| EP | 3 053 098 A1 | 8/2016 |
| EP | 3 082 292 A1 | 10/2016 |
| EP | 3 086 251 A1 | 10/2016 |
| GB | 2501240 A | 10/2013 |
| GB | 2501362 A | 10/2013 |
| JP | 2017-045161 A | 3/2017 |
| KR | 20110102073 A | 9/2011 |
| KR | 20180065889 A | 6/2018 |
| PL | 209208 B1 | 8/2011 |
| WO | WO 2006/002552 A1 | 1/2006 |
| WO | WO 2015/044051 A1 | 4/2015 |
| WO | WO 2015/063087 A1 | 5/2015 |
| WO | WO 2015/103079 A1 | 7/2015 |
| WO | WO 2016/077601 A1 | 5/2016 |
| WO | WO 2016/167173 A1 | 10/2016 |
| WO | WO 2016/204968 A1 | 12/2016 |
| WO | WO 2017/139325 A1 | 8/2017 |
| WO | WO 2017/205543 A1 | 11/2017 |
| WO | WO 2018/058554 A1 | 4/2018 |
| WO | WO 2018/093251 A1 | 5/2018 |
| WO | WO 2018/118120 A1 | 6/2018 |
| WO | WO 2018/176020 A1 | 9/2018 |
| WO | WO 2019/000445 A1 | 1/2019 |

(56) References Cited

FOREIGN PATENT DOCUMENTS

WO     WO 2019/046406 A1     3/2019
WO     WO 2019/074366 A1     4/2019

OTHER PUBLICATIONS

Vorobiev et al., Facial Liveness Detection With A Mobile Device, U.S. Appl. No. 17/006,256, filed Aug. 28, 2020.
Jourabloo et al., Face De-Spoofing: Anti-Spoofing via Noise Modeling. ECCV 2018. 2018. pp. 1-17.
U.S. Appl. No. 17/006,256, filed Aug. 28, 2020, Vorobiev et al.
PCT/IB2020/000703, Dec. 18, 2020, Invitation to Pay Additional Fees.
PCT/IB2020/000703, Mar. 22, 2021, International Search Report and Written Opinion.

\* cited by examiner

ID VERIFICATION WITH A MOBILE DEVICE

RELATED APPLICATIONS

This application claims priority to and the benefit under 35 U.S.C. § 119(e) of U.S. Provisional Patent Application Ser. No. 62/893,556, filed Aug. 29, 2019, entitled "ID VERIFICATION WITH A MOBILE DEVICE," which is hereby incorporated herein by reference in its entirety.

BACKGROUND

Widespread availability of network-connected end user computing devices that can be used to access websites and other network-connected servers has enabled users of those computing devices to initiate many types of transactions from virtually anywhere they can access an end-user computing device. This capability provides incredible convenience for users. Users, for example, may initiate financial transactions, such as transferring money from an account, checking an account balance, or depositing a check without going to a bank or financial institution. Users may order products or services without going to a store, communicate with friends or co-workers while waiting for a train, or engage in many other types of transactions in places and at times that are convenient for them.

As advances in electronics have reduced the size of end user computing devices, many people now routinely carry portable computing devices, such as smart phones. As a result, the ability to initiate transactions from convenient places at convenient times has greatly expanded. However, with this expanded flexibility to initiate transactions has come greater risk of unauthorized transactions.

Identity verification is widely used to limit transactions initiated from an end-user computer to reduce the risk that unauthorized users will initiate transactions. Most identity verification requires establishing a trust relationship between the authorized user and the system that will process transactions for that user. For example, at the time of opening a financial account, a user may create login credentials, such as a user name and password. Any user with those credentials may be treated as an authorized user. When a user is physically present at a location with employees of the company providing a service, where those employees can perform manual checks of identification documents.

SUMMARY

Systems and methods related to automated verification of identification documents and detection of facial spoof attacks are described. Such systems and methods may provide improvements for verifying a user's identification prior to remotely performing secure transactions. In such applications, automatically performing remote user verification may reduce the need for a human operator to perform verification checks such as video calling the user. Including automated methods for verifying identification documents and detecting facial spoof attacks may improve a user's experience performing securing transactions.

In some embodiments, an at least one non-transitory computer-readable medium comprising instructions is provided. The instructions, when executed by a computing device, cause the computing device to carry out a method of verifying the validity of at least one security feature of an identification document by capturing a plurality of images using a camera, and analyzing the captured images by recognizing images of the plurality of images as images of an identification document, computing the angle of the camera relative to the identification document for the recognized images of the plurality of images, identifying at least one security feature of the identification document based on the recognized images taken at multiple angles, and verifying validity of the at least one security feature based on the recognized images taken at multiple angles.

In some embodiments, a computing device comprising a camera, an at least one processor, and at least one non-transitory computer-readable medium comprising instructions is provided. The instructions, when executed by the at least one processor, cause the computing device to perform a method of capturing a plurality of images using the camera and analyzing the captured images by recognizing images of the plurality of images as images of an identification document, computing the angle of the camera relative to the identification document for the recognized images of the plurality of images, identifying at least one security feature of the identification document based on the recognized images taken at multiple angles, and verifying validity of the at least one security feature based on the recognized images taken at multiple angles.

In some embodiments, a computing system comprising a camera, at least one processor, and at least one non-transitory computer-readable medium comprising instructions is provided. The instructions, when executed by the at least one processor, cause the computing device to perform a method of using the at least one processor to perform verifying validity of an at least one identified security feature of an identification document and identifying a plurality of images as comprising at least one of images of a live user and images of a spoof attack.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

The inventors have recognized and appreciated techniques for using a mobile device to enable a user to initiate transactions that are restricted to authorized users. These techniques may leverage identity verification operations that are sufficiently secure, quick and low cost to enable the identity of a user of a mobile device to be verified such that the transaction may be initiated or blocked based on whether the user of the mobile device is authorized to initiate the transaction. These techniques, for example, may be used to onboard a new user to a secure transaction system (e.g., a financial or governmental institution), to authorize a financial transaction, or perform any other transaction in which the identity of the user is determined or the user is determined to be an authorized user.

Automated identity verification techniques as described herein may be performed wholly or partly on an end-user computer, which may be a user's mobile device. In some embodiments and/or in some scenarios, the identity of a user may be automatically verified without manual checks such that the identity of a user may be verified at low cost. Such techniques may be based on using a camera of a mobile device to acquire images of an identification document and of the user of the mobile device. Processing of the images of the identification document may determine that the identification document is authentic. Processing of the images of the user may be used to determine that the images are of a live person and that those images depict the person indicated in the identification document. In some embodiments, images of the user may be compared to an image acquired from the identification document.

In some embodiments, the identification document may be determined to be authentic based on one or more checks on the format of the document. Those checks may include comparing multiple images, acquired from different angles, to determine whether one or more security features, such as direction-sensitive feature which may be a hologram or a lenticular feature, is present and/or present in a predetermined location on the identification document. In some embodiments, the liveness of a user of the mobile device may be determined using a neural network trained using facial depth features extracted from examples of spoofing attacks as negative examples and facial depth features extracted from images of live people as positive examples.

Following below are more detailed descriptions of various concepts related to, and embodiments of, techniques for identity verification. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 1:
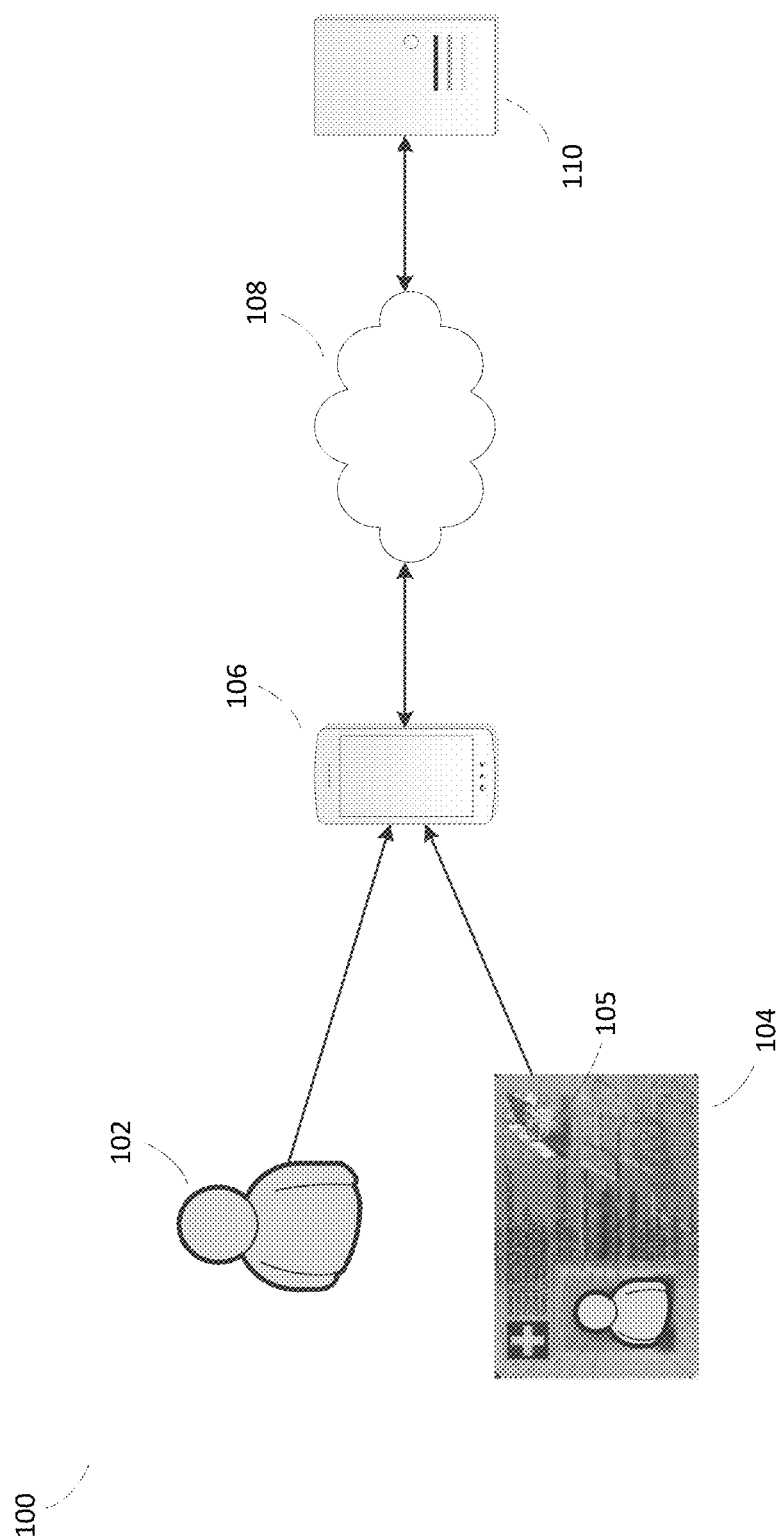
FIG. 1 depicts, schematically, an illustrative system for identification document matching, according to some embodiments.

FIG. 1 depicts, schematically, an illustrative system 100 for performing user and/or identification document (ID) verification. According to some embodiments, the system 100 may comprise an end-user device 106 that is equipped with a camera that can capture images and/or video of the user 102 and/or the ID 104. The end-user device 106 may communicate with a remote server 110 through a cloud connection 108 to transmit data, such as the captured images of the user 102 and/or the ID 104 and/or results of processing of images of a user and/or identification documents. Remote server 110 may be a server that performs a transaction initiated by user 102 or may be a separate authentication server that communicates authentication information to another server (not pictured) that may be programmed to implement a transaction when the authentication server provides authenticated information from which the transaction server may determine that user 102 is an authorized user.

The ID 104 may take any format, including, for example, paper documents, national ID cards, and national passports. ID 104 may include multiple features, such as text, a photograph, or symbol. ID 104 may also include one or more security features 105. Security feature 105 may be a direction-sensitive feature, changing in appearance depending on viewing angle, such as a hologram, as depicted here, or a lenticular feature including lenticular text and/or lenticular imagery.

The end-user device 106 may be a computing device, examples of which are discussed in more detail in connection with FIG. 14. End-user device 106 may include a camera or may be otherwise suitably electrically coupled with a camera for capturing images used for identity verification. The camera may be such that images of user 102 and/or ID 104 may be captured from multiple angles. In the example of FIG. 1, end-user device 106 is depicted as a portable computing device (e.g., a smartphone), such that images may be captured from multiple angles by moving the portable computing device. In embodiments in which end-user device 106 is a non-portable computing device (e.g., a personal computer), images may be captured from multiple angles by moving the camera relative to the computing device or moving the ID or having the user move relative to the camera.

To perform user and/or ID verification, end-user device 106 may capture one or more images of the user 102 and/or the user's ID 104. The end-user device 106 may perform image processing on the captured images to prepare the captured images for verification. End-user device 106 may perform the process of verification on a local processor, or may transfer data through cloud connection 108 to remote server 110 so that remote server 110 may perform the process of identity verification. Techniques as described herein may require sufficiently low computational resources and external data that they may be performed on a portable computing device, which may have significantly less computing power and access to data than a network connected server. In embodiments in which the verification is performed on a local processor, the local processor may transmit the results of that processing to the remote server 110. Those results and, in some embodiments any or all other information, may be between end-user device 106 and remote server 110 in an encrypted format.

The process of identity verification may include verifying the validity of the ID 104 by analyzing and verifying security features 105 of ID 104, according to some embodiments. A process 200 of verifying the validity of at least one security feature 105 of ID 104 using end-user device 106 is described in FIG. 2. In some embodiments, the process 200 may be performed by hardware (e.g., using an application-specific integrated circuit (ASIC), a field-programmable gate array (FPGA), or any other suitable circuitry), software (e.g., by executing the software using a computer processor), or any suitable combination thereof. Process 200 may be started automatically by a software program for identity verification, or process 200 may be started in response to input from a user or an institution (e.g., via a remote server) with which the user is performing a transaction. Process 200 may be implemented by, for example, an end-user device such as end-user device 106 of FIG. 1.

In act 202, a plurality of images comprising ID 104 may be captured using a camera associated with end-user device 106. The plurality of images may be taken at multiple angles, and end-user device 106 may provide instructions or feedback to the user about which angles the ID 104 may be held relative to the camera of end-user device 106 in order to capture all required information for ID validation. For example, a processor performing act 202 may be programmed to collect a set of images of an identification document including an image acquired within a first predetermined angular range, such as +/−5 degrees, from a normal to the plane of the document and multiple images acquired at second predetermined angular range (such as 30 to 60 degrees) with respect to the normal taken at at least four locations, for example, around the document. Regardless of the specific criteria used to determine whether sufficient images have been captured, when processing at act 202 determines that the images captured do not meet the criteria, arrows may be displayed on a user interface or other output may be provided to guide the user to move the camera associated with the end-user device 106 and/or move the identification document to locations where images meeting the criteria may be acquired.

In act 204, images of the plurality of images are recognized as comprising an ID 104, according to some embodiments. Image recognition may be performed using any suitable method, including but not limited to text extraction, optical character recognition (OCR), face detection, template matching, and/or feature matching. Act 204 may include recognizing the type of ID 104 present in the images of the plurality of images. To recognize the type of ID 104, feature matching may be performed by computing keypoints of images of ID 104 and comparing the computed keypoints to keypoints of one or more template images. Examples of keypoint detector and descriptor algorithms that may be used include AGAST, FREAK, ORB, and/or BRISK.

In some embodiments, an identification system may store a library of templates of valid identification documents. That library may be stored on end-user device 106 or remote server 110 or may be distributed across the two. To identify images of ID 104, the processor performing the verification may compare features extracted from images of ID 104 to one or more templates. In some embodiments, information, such as text or a symbol on the ID 104 itself, may be used to select the templates for comparison. For example, a symbol or text indicating that the document was issued by the government of Switzerland may be used to identify a subset of the templates in the library, downselecting to templates of valid identification documents issued by the government of Switzerland. Alternatively or additionally, information input by a user or another source may downselect to a subset of the templates in the library. A user, for example, may enter, through a user interface on end-user device 106, characteristics of the identification document, such as type of document and issuing authority. Regardless of the manner in which the library of templates is downselected to a subset, features extracted from images of ID 104 may be compared to the templates to select the best matching template. Matching to a template may indicate that an object within an image is an identification document. Additionally, by matching to a template, the nature and location of one or more security features which should be present if the identification document is valid may be determined from the matching template.

In act 206, for each image recognized as comprising an ID 104, the angle of the image plane of the camera relative to the ID 104 may be computed, according to some embodiments. Calculating the angle of the image plane of the camera relative to the ID 104 may allow for providing feedback to the user about required views of the ID 104 for validation as well as for extracting a rectified image of ID 104 for later processing. In some embodiments, the calculated angle of the image plane of the camera relative to the ID 104 may be used in validating one or more of the security features 105 of ID 104. An exemplary method of determining required views is described below in connection with FIG. 3A. In act 208, at least one security feature of the ID may be identified. A security feature may be, for example, one or more holograms, lenticular text, and/or lenticular images. Identifying an at least one security feature of the ID may be performed by template matching methods and comparing the ID to known ID templates, as described in connection with act 204 above. The known ID templates may be stored locally (e.g., on illustrative end-user device 106 of FIG. 1) or remotely (e.g., in cloud storage or on a remote server such as illustrative remote server 110 of FIG. 1) or may be distributed across the two.

At act 210, for each set of images recognized as depicting an identification document, image processing may be performed on the regions of the recognized images around the at least one identified security feature. The applied image processing techniques may be selected based on the type of identified security features, as will be described further in connection to FIG. 4. Image processing may be performed locally on end-user device 106 or may be performed remotely (e.g., on illustrative remote server 110) or may be distributed between the two.

At act 212, the validity of the at least one security feature may be verified based on the processed images from act 210. Validity may be determined in any suitable way, for example, by comparing pixels of the processed images against a predefined threshold of accuracy or by verifying extracted text. Verification may be performed locally on end-user device 106, may be performed remotely (e.g., on illustrative remote server 110), or may be distributed between the two. Verification or a failure to verify may result in an output (e.g., a noise, image, and/or text) to the user on end-user device 106. Alternatively or additionally, the results of verification processing in act 212, alone or in conjunction with information obtained from the identification document, may be communicated to remote server 110 or otherwise communicated to another part of a system. For example, end-user device 106 of FIG. 1 may send a message indicating characteristics of the verified identification document, such as type of document, issuing authority, date of issue or date of expiration, and/or the name on the document.

As described in relation to act 204 of FIG. 2, determining the angle of the image plane of the camera relative to the ID 104 may be used to provide feedback to the user while capturing images and to extract a rectified image of the ID 104 for later processing, according to some embodiments. Additionally, in some embodiments, the calculated angle of the image plane of the camera relative to the ID 104 may be used in validating the one or more security features 105 of the ID 104.

Figure 2:
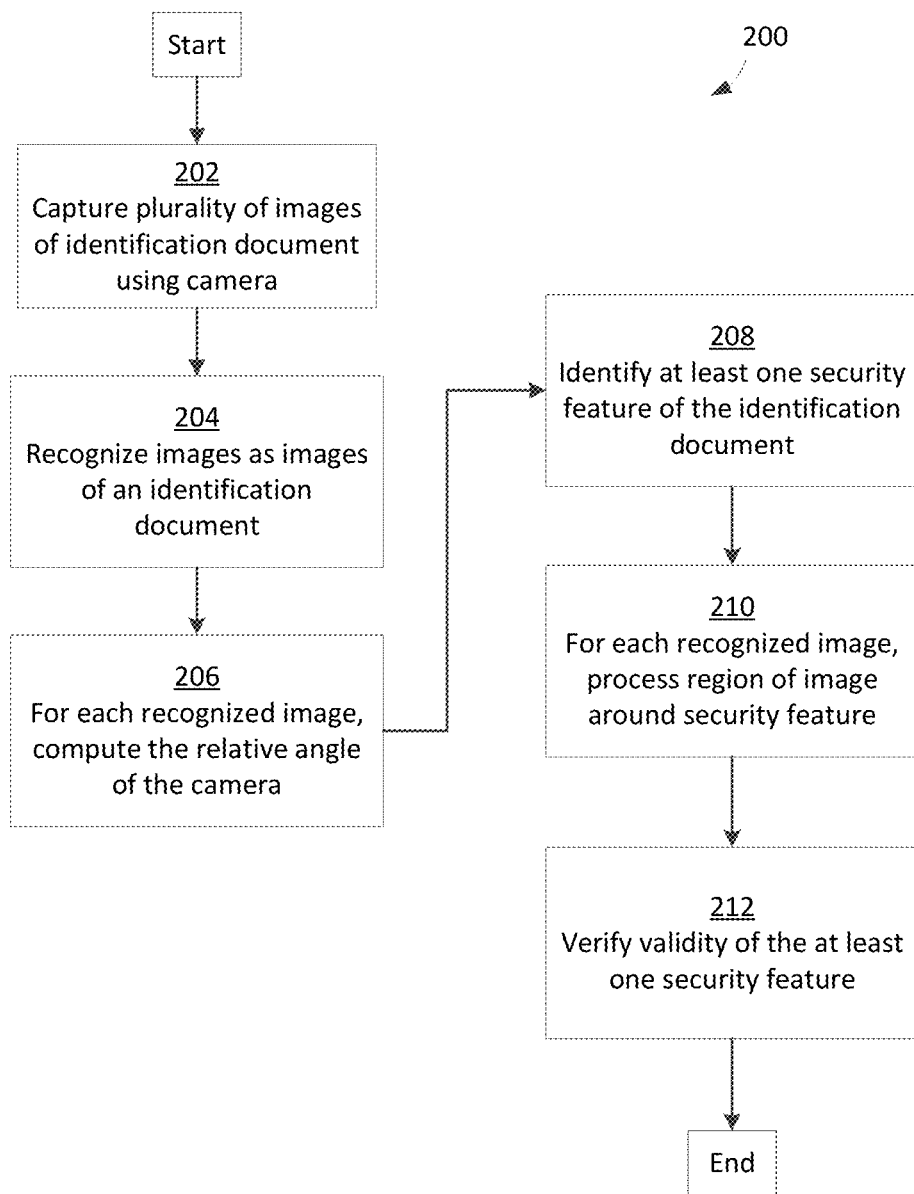
FIG. 2 is a flowchart describing a method of verifying validity of a security feature of an identification document, according to some embodiments.
Figure 3A:
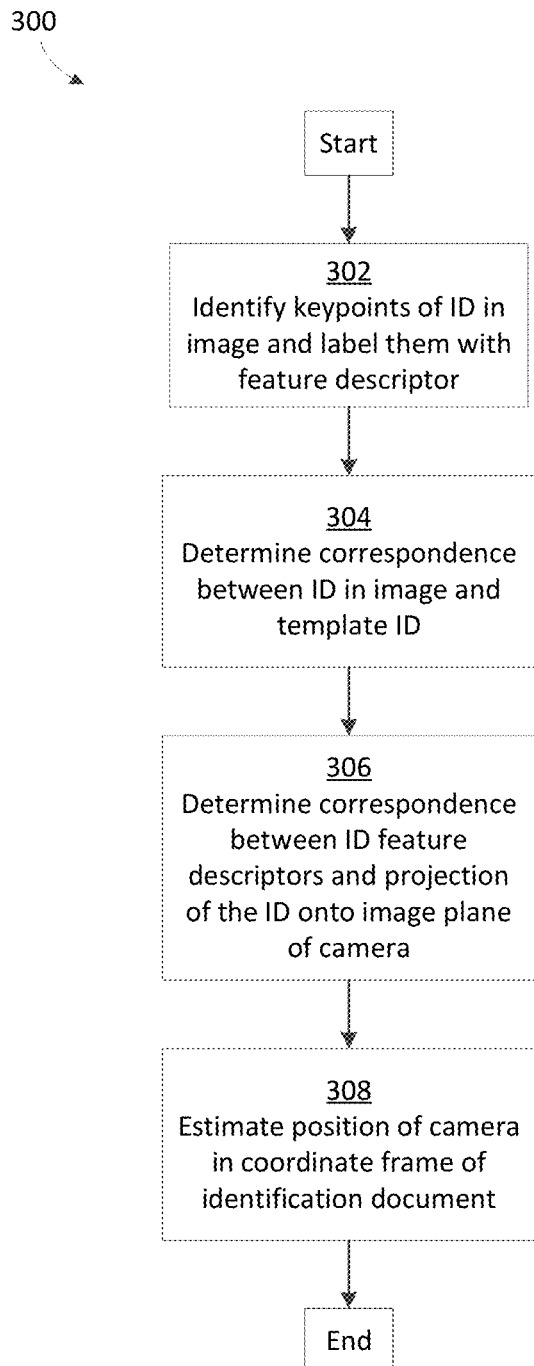
FIG. 3A is a flowchart describing a method of calculating a position of a camera in a coordinate frame of an identification document, according to some embodiments.
Figure 3B:
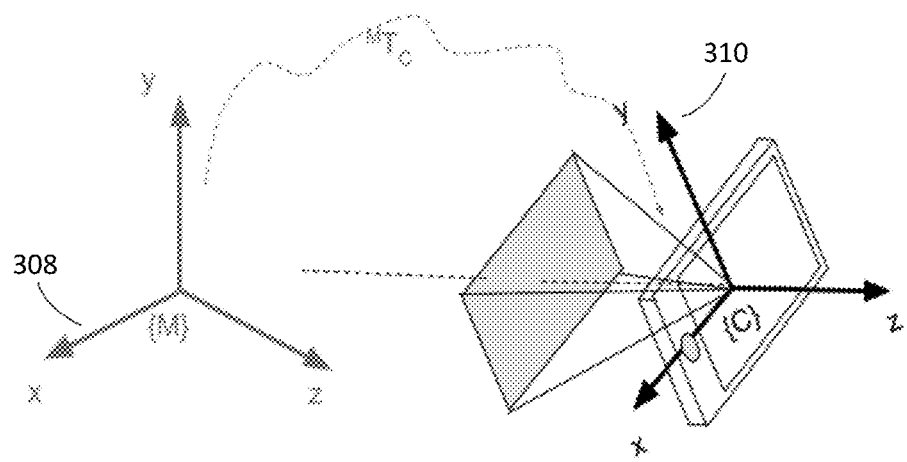
FIG. 3B depicts, schematically, mapping a coordinate system of an identification document to a coordinate system of a portable computing device, according to some embodiments.

An illustrative process 300 for determining the angle of the image plane of the camera relative to the ID 104 is described in FIG. 3A and may be used in act 206 of FIG. 2. The process 300 may compute the relative angle between the image plane of the camera and the plane of the identification document by determining a mapping of a marker frame 308 (e.g., a frame of reference of a known template ID) to a camera frame 310 (e.g., the image plane of the camera), as shown in FIG. 3B. In some embodiments, the process 300 may be performed by hardware (e.g., using an application-specific integrated circuit (ASIC), a field-programmable gate array (FPGA), or any other suitable circuitry), software (e.g., by executing the software using a computer processor), or any suitable combination thereof.

According to some embodiments, feature description and matching techniques may be used to determine positional correspondences between a marker frame 308 of the template ID and the camera frame 310 of the camera, wherein the marker frame 308 and camera frame 310 are coordinate systems of the template ID and the camera, respectively. In scenarios in which these feature descriptors are unique, they may be matched to corresponding points on the current image frame. In scenarios in which the feature descriptors are not unique, a matching score may be determined based on degree of match between multiple features in an image of a document and a template.

Figure 3C:
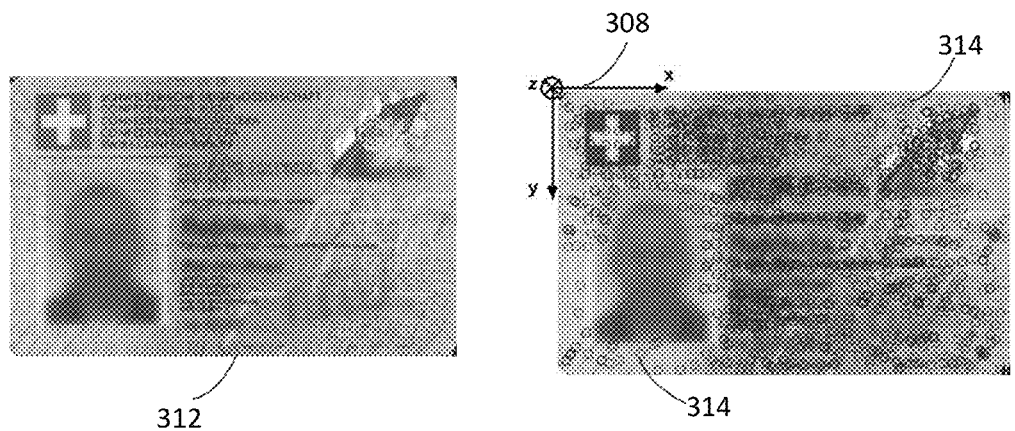
FIG. 3C depicts a feature mapping of a known identification document, according to some embodiments.

An illustrative, representative ID 312 which may be used to form a template ID is shown at left in FIG. 3C, in accordance with some embodiments. At right in FIG. 3C is shown an illustrative template ID 313 with feature descriptors 314 circled and marker frame 308 coordinate axes identified.

Figure 3D:
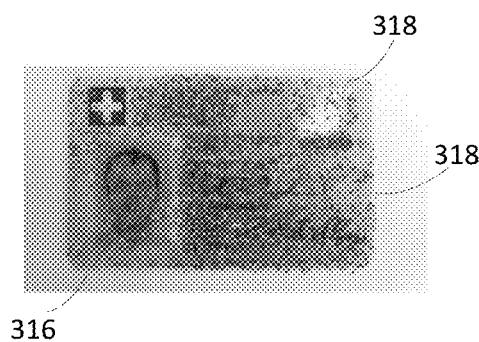
FIG. 3D depicts a feature mapping of an example identification document, according to some embodiments.
Figure 3E:
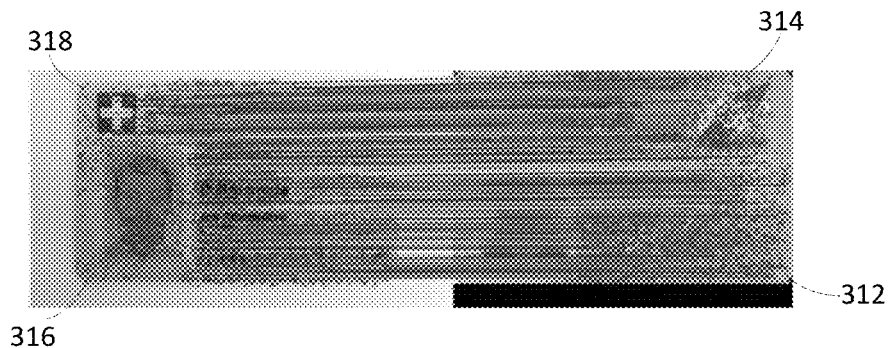
FIG. 3E depicts a feature mapping and tracking of the example identification document of FIG. 3D in correspondence to the known identification document of FIG. 3C, according to some embodiments.

In act 302, keypoints of the ID in the captured image frame may be identified and labeled with a feature descriptor. An illustrative image of an ID 316 with feature descriptors 318 circled is shown in FIG. 3D. Keypoints may be identified and labeled in accordance with keypoint detector and descriptor algorithms such as, as a non-limiting example, AGAST, FREAK, ORB, and/or BRISK In act 304, the correspondences between feature descriptors 318 of the ID 316 in the captured image frame and the feature descriptors 314 of the template ID 313 are determined. The correspondences between the feature descriptors 318 and 314 may additionally be tracked. An illustrative tracking of correspondences between the feature descriptors 318 of ID 316 and the feature descriptors 314 of template ID 313 is shown in FIG. 3E, with lines connecting feature descriptors 318 and feature descriptors 314. This tracking may be performed, for example, using the Pyramid Lucas-Kanade method for sparse optical flow.

Figure 3F:
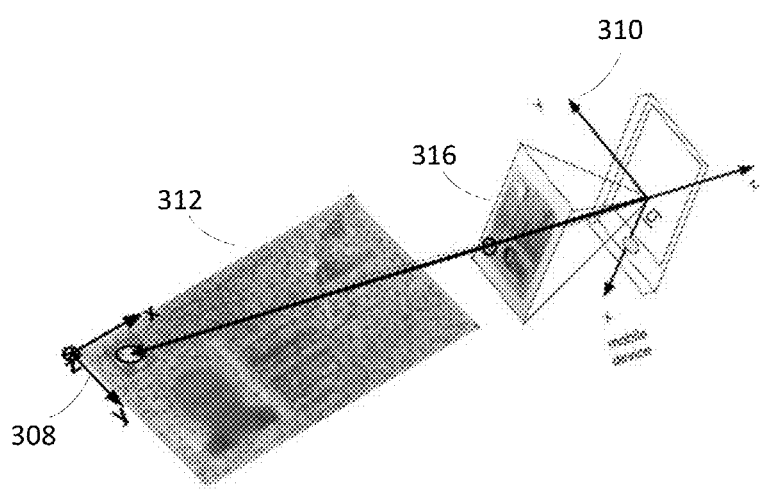
FIG. 3F depicts correspondence positioning of an example identification document relative to a known identification document in a coordinate frame of a portable computing device, according to some embodiments.

In act 306, the correspondences between the feature descriptors 318 of the ID 316 in the image frame and the projection of the ID 316 to the image plane of the camera may be determined. For example, a Perspective-n-Point algorithm may be used to estimate a transformation matrix describing the transformation of the camera coordinate system 310 with respect to the marker coordinate system 308. The transformation matrix may have rotational and a translational components which may be used to relate translation and rotation components of the camera to any other coordinate system for which the relative transformation to the marker coordinate system is known. Based on these determined correspondences, the angle of the image plane of the camera relative to the marker frame 308 of the template ID may be determined, as shown schematically in FIG. 3F.

Figure 4:
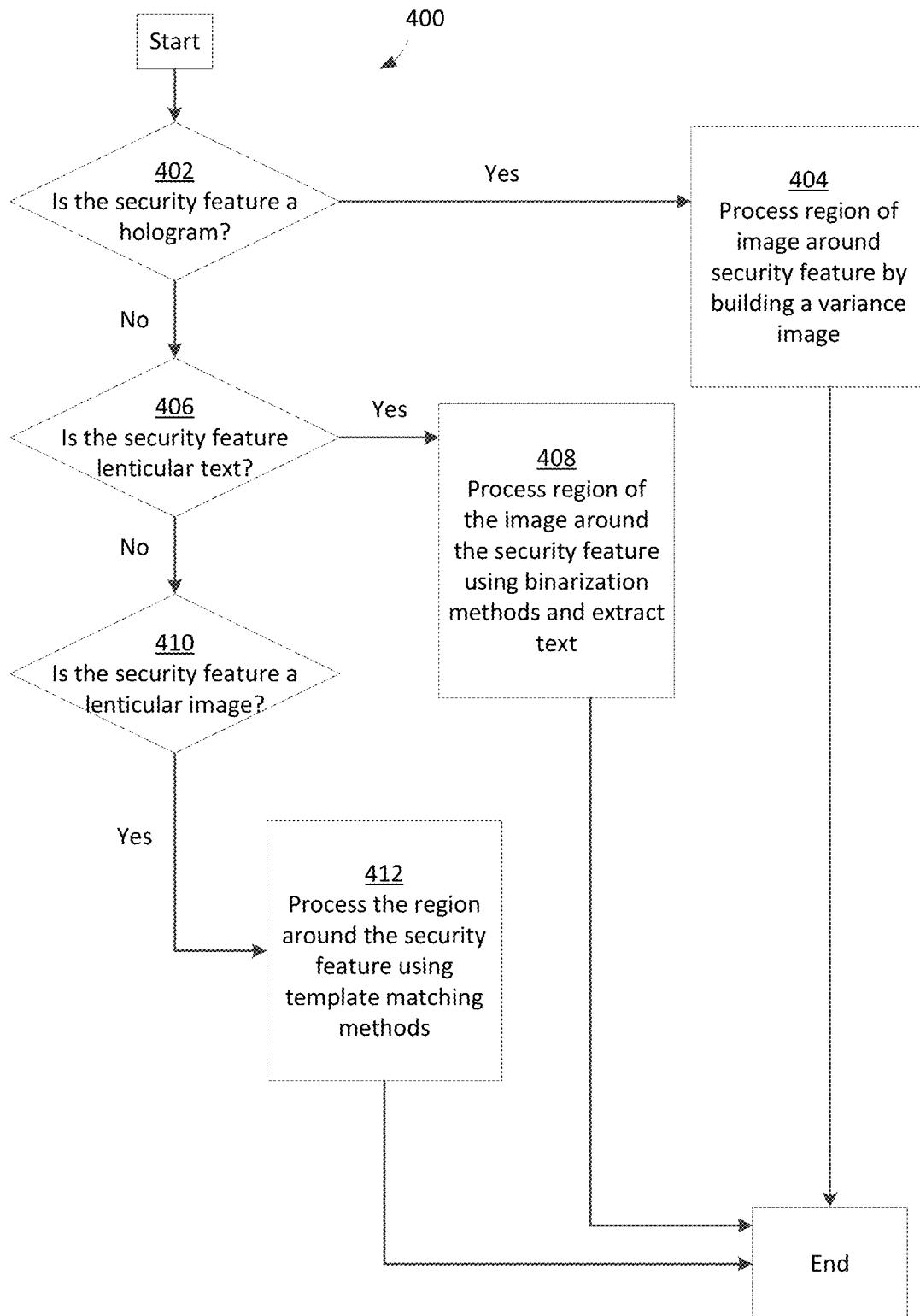
FIG. 4 is a flowchart describing a method of processing images of a security feature for verifying validity of the security feature, according to some embodiments.

As discussed, the methods of image processing used in act 210 of FIG. 2 may differ based on the at least one identified security feature of the ID. FIG. 4 shows an illustrative process 400 for processing a region of an image comprising an ID based on the type of security features identified on the ID. Process 400 may be used in act 210 of FIG. 2 to perform image processing to verify the validity of the security feature of an ID. In some embodiments, process 400 may be performed by hardware (e.g., using an application-specific integrated circuit (ASIC), a field-programmable gate array (FPGA), or any other suitable circuitry), software (e.g., by executing the software using a computer processor), or any suitable combination thereof.

In act 402, it may be determined whether the security feature is a hologram. This determination may be made based on a known template ID, as discussed previously in connection with FIG. 2. If it is determined that the security feature is a hologram, in act 404, the region of the image around the hologram may be processed in order to calculate a variance image for use in validating the hologram. The variance image may be created by comparing the intensity value of each pixel in the region of the image around the security feature with a mean intensity value for that pixel computed from multiple images of the ID (e.g., by calculating a difference between the intensity values, or by calculating a variance). The variance image may then be formed from the output of the comparisons (e.g., each pixel of the variance image may represent a difference between the intensity value of each pixel of the raw image and the mean intensity value for that pixel).

Figure 5A:
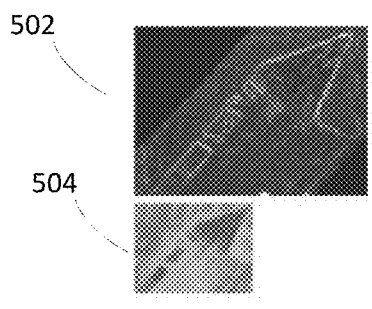
FIGS. 5A-5C depict examples of raw images of a hologram and corresponding processed images of a hologram for verifying validity, according to some embodiments.
Figure 5B:
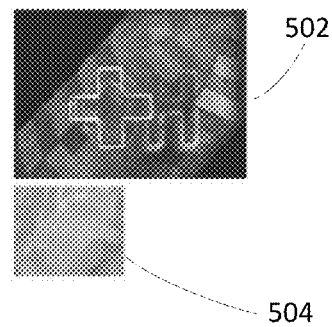
Figure 5C:
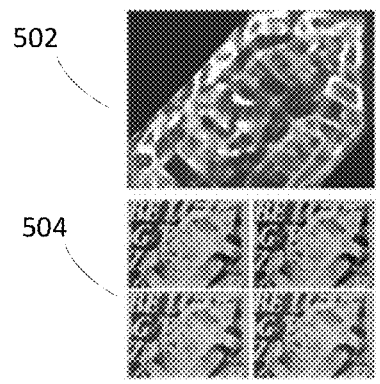

Examples of variance images 502 are shown in FIGS. 5A-5C, with corresponding raw images 504 of the holograms. As should be appreciated from these examples, the variance images 502 may highlight edges of the holographic features (e.g., the bright edges of the plus sign and letter H in FIG. 5B). Additionally, the variance images may flatten non-holographic features (e.g., the black background of variance image 502 in FIG. 5C, whereas the raw images display text).

Features may be extracted from the variance image in order to classify the security feature as valid. These extracted features may include the normalized inverted intensity of the image. Additionally, the extracted features may include the distance between calculated cluster centers of high intensity values of the variance image and calculated cluster centers of high intensity values of a hologram from a known template ID. For example, k-means clustering may be used to determine cluster centers. Alternatively or additionally, a Gaussian mixture model using an expectationmaximization algorithm may be used to determine cluster centers. The security feature may be classified as valid or not valid by means of a quadratic boundary.

If, in act 402, it is determined that the security feature is not a hologram, it may be determined in act 406 whether the security feature is lenticular text. If the security feature is determined to comprise lenticular text, the region around the lenticular text may be processed in act 408 using binarization methods and artifact removal methods in order to prepare the text for text extraction (e.g., optical character recognition).

Figure 6A:
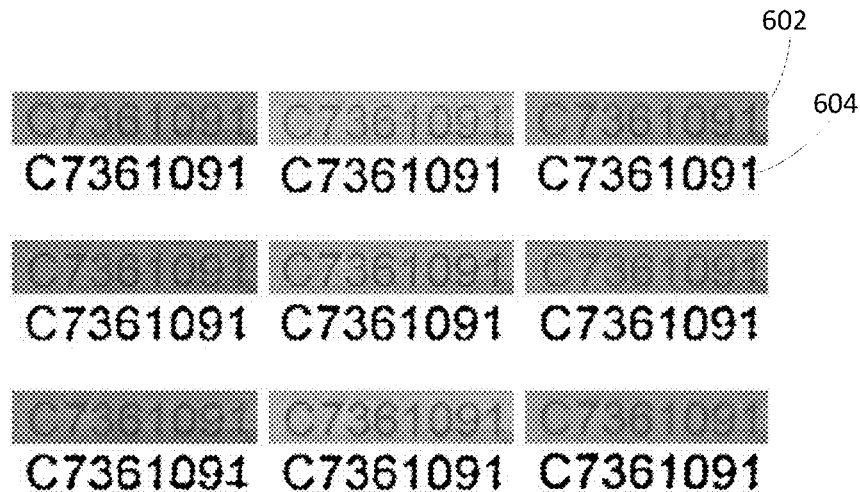
FIG. 6A depicts examples of text extraction from a lenticular security feature, according to some embodiments.

An illustrative series of lenticular text 602 is shown in FIG. 6A with corresponding extracted text 604. Each example was processed with a binarization method and/or method of image artifact removal prior to text extraction. Artifact removal may comprise, for example, computing contour areas and removing areas below a threshold value. In particular, binarization methods adapted for poorly illuminated images may be suitable for this application.

Figure 6B:
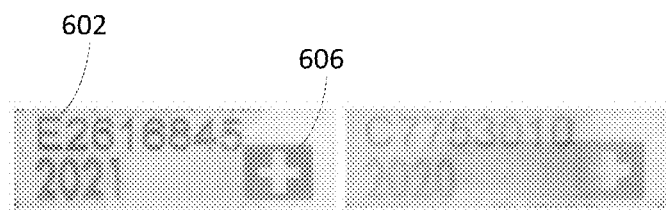
FIG. 6B depicts examples of a lenticular security feature, according to some embodiments.

If, in act 406, it is determined that the security feature is not lenticular text, it may be determined in act 410 whether the security feature comprises a lenticular image. The region around the lenticular image may then be processed in act 412. The region may be processed using template matching methods to match the lenticular image to known lenticular images of a known ID template image. For example, one or more of matchTemplate and CV_TM_CCORR_NORMED may be used. Illustrative lenticular images 606 are shown alongside lenticular text 602 in FIG. 6B.

Facial verification may be used to correlate an identification document with a user's facial features, according to some embodiments. In some embodiments, the system may detect if a person is trying to spoof the system by showing a facial spoofing attack rather than imaging a live person using the system. Examples of such facial spoofing attacks may include playing a pre-recorded video (a replay attack), displaying a photograph of a person (a print attack), or wearing a mask (a mask attack). The inventors have recognized and appreciated that deep learning models that make use of facial appearance and depth features for liveness detection may be useful for liveness detection and may therefore detect facial spoofing attacks.

Figure 7:
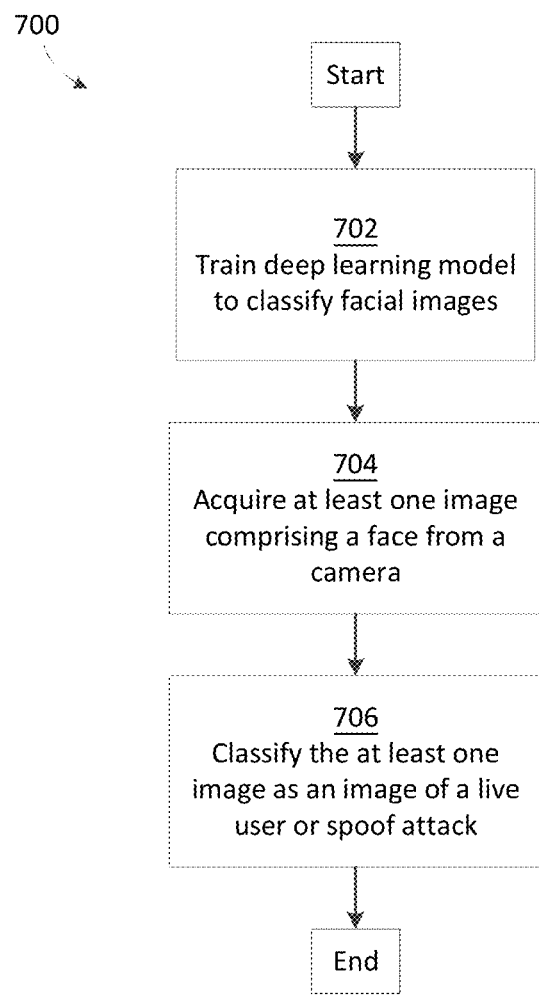
FIG. 7 is a flowchart describing a method of classifying an image comprising a face as an image of a live user or a spoof attack, according to some embodiments.

FIG. 7 shows a process 700 for liveness detection using a deep learning model. In some embodiments, process 700 may be performed by hardware (e.g., using an application-specific integrated circuit (ASIC), a field-programmable gate array (FPGA), or any other suitable circuitry), software (e.g., by executing the software using a computer processor), or any suitable combination thereof. Acts of process 700 may be performed by one or more computing devices of a system (e.g., illustrative system 100 of FIG. 1)

In act 702, a deep learning model is trained to classify facial images as either images of a live user or a spoof attack. The deep learning model may be, for example, a convolutional neural network (CNN) or a fully convolutional network (FCN) comprising multiple layers. The deep learning model may be trained using a training dataset. The training dataset, for example, may comprise facial depth information gathered from a set of images including images of live faces and images of spoof attacks. The deep learning model may be trained remotely from the end-user device and then implemented on the end-user device for classifying images locally, or the deep learning model may be implemented remotely from the end-user device (e.g., on a remote server) for classifying images remotely.

In act 704, a camera of the end-user device may capture at least one image comprising a face. The system may recognize the image as an image comprising a face by using methods of facial feature extraction and/or keypoint matching. The at least one image comprising a face may be captured as a still image. Alternately, or additionally, the at least one image comprising a face may be captured as an image frame of a stream of images (e.g., a video).

Next, in act 706, the at least one captured image may be classified as an image of a live user or as a spoof attack. The at least one captured image may be classified by passing the at least one captured image through the deep learning model for classification.

Figure 8:
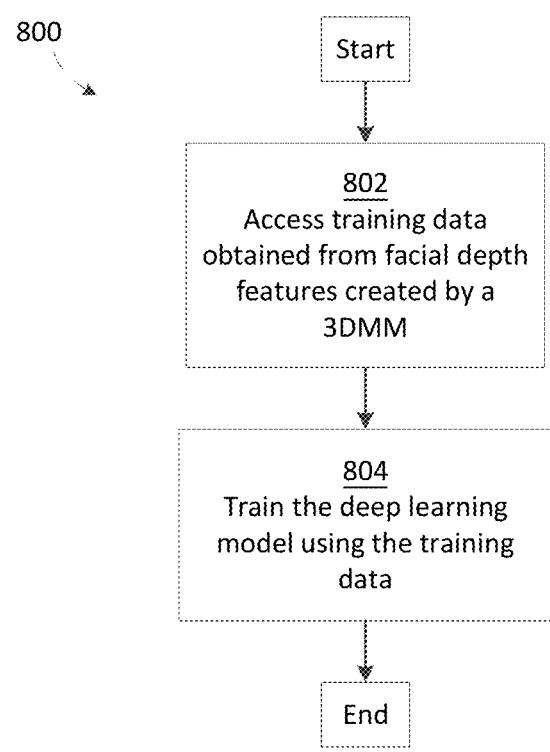
FIG. 8 is a flowchart describing a method of training a deep learning model, according to some embodiments.

FIG. 8 shows a process 800 of training a deep learning model for liveness detection. In act 802, training data is accessed to obtain facial features extracted from training images containing images of faces. The extracted facial features may include keypoints extracted from facial landmarks (e.g., corners of eyes, jawlines, nostrils, etc.). The training data may be accessed from a local storage device (e.g., memory) or from remote storage device (e.g., over the internet, through the cloud, etc.) or some combination thereof.

Figure 9:
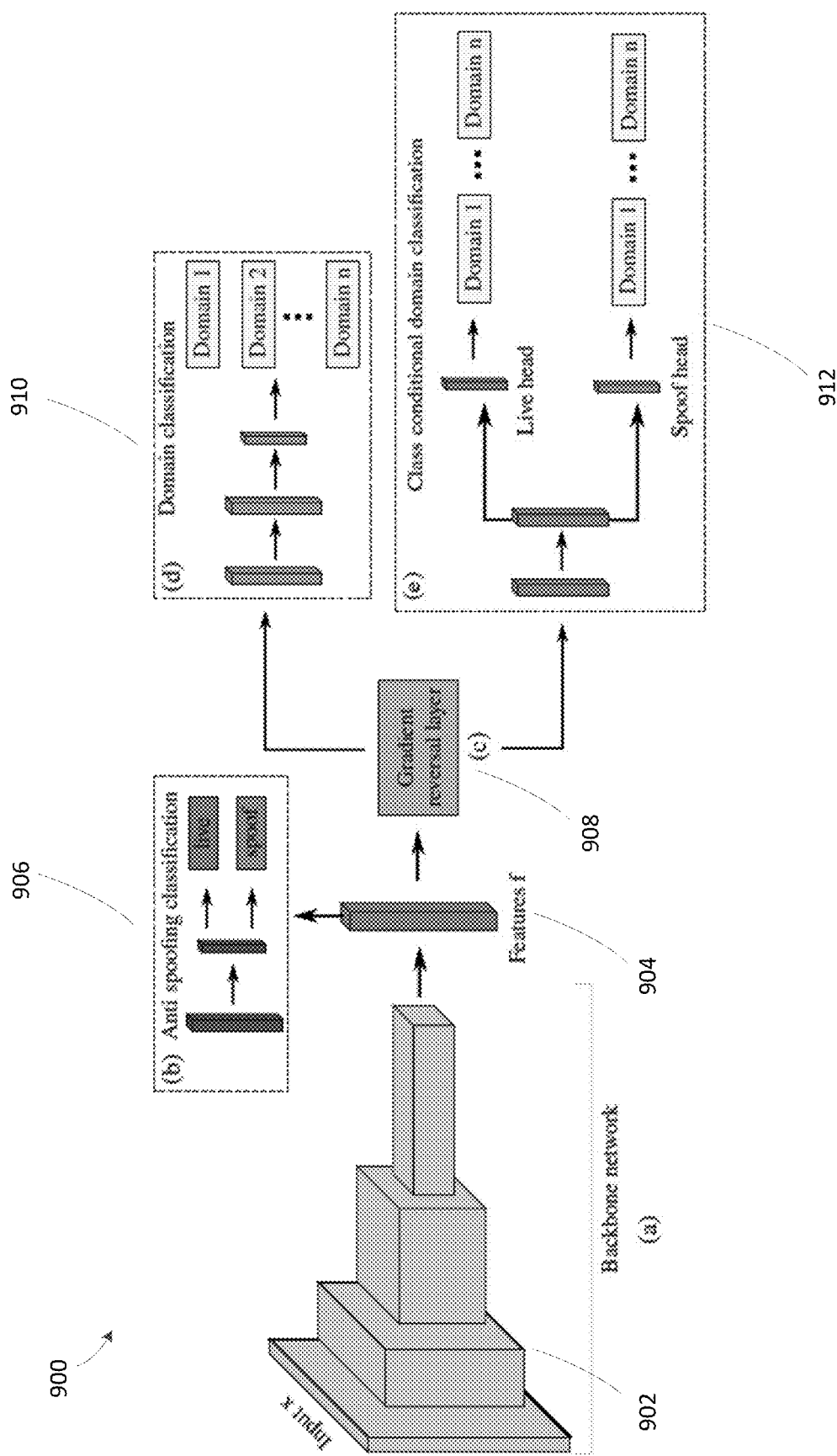
FIG. 9 depicts an example neural network architecture for classifying an image comprising a face as an image of a live user or a spoof attack, according to some embodiments.

In act 804, the deep learning model may be trained using the training data obtained from the training images. Deep learning model CNN 900 of FIG. 9 may be an example of a suitable deep learning model for liveness detection that may be trained at act 804. In the example of FIG. 9, training may be performed by incorporating feedback from the depth map loss 910 as batches of images 902 are passed through the CNN 900.

FIG. 9 shows a schematic deep learning model 900 for facial spoofing detection, in accordance with some embodiments described herein. Deep learning model 900 may be implemented in process 800 of FIG. 8 to classify facial images as either images of a live face or images of a spoof attack. Deep learning model 900 may be designed to be equally adept at identifying spoof attacks of multiple forms, including but not limited to print attacks, replay attacks, and mask attacks. The network architecture of deep learning model 900, which may include a generative adversarial network, may prevent deep learning model 900 from being over trained on any one particular type of spoof attack.

According to some embodiments, deep learning model 900 may comprise a backbone network 902 that is configured to take in the images comprising a face and output a feature vector 1304 which can be used for classification. Backbone network 902 may be implemented, for example, a residual network (e.g., ResNet-50). Backbone network 902 may take as input images comprising a face. The images may be captured as still images by a camera associated with an end-user device (e.g., end-user device 106 of FIG. 1), or the images may be captured as a stream of image frames (e.g., a video) by a camera associated with an end-user device (e.g., end-user device 106 of FIG. 1).

In some embodiments, backbone network 902 may output a feature vector 904. The input images may be encoded into feature vector 904, which may have a reduced dimensionality as compared to the input images. The feature vector 904 may be used for classifying the input images comprising a face as either images comprising a live user or images comprising a facial spoof attack. The feature vector 904 may also be passed to a generative adversarial network, to prevent the backbone network from being over trained on any single type of facial spoof attack.

In some embodiments, the feature vector 904 may be passed as input to the label classifier 906 for classifying the input image as either comprising a face of a live user or a facial spoof attack. The label classifier 906 may consist of a small network with two or more linear transformations connected by an intermediate rectified linear unit (ReLU) and/or a dropout layer. The label classifier 906 may process the feature vector 1304 to output a classification score vector having C elements (e.g., in this example C=2, representing "live" and "spoof").

In some embodiments, the feature vector 904 may also be passed to a gradient reversal layer (GRL) 908. The GRL 908 may modify the parameters of the backbone network 1302 to reduce disparities in the performance of the label classifier 906 in classifying images from multiple datasets. During forward propagation, the GRL 908 may act as an identity transform. The GRL 908 may pass the feature vector 904 to the domain classifier 910 and the class conditional domain classifier 912.

However, in some embodiments, when training the backbone network 902, during a backpropagation step, the GRL 908 may multiply the derivative of the loss outputs from the domain classifier 910 and/or the class conditional domain classifier 912 by a negative scalar. This "gradient reversal" may then be back propagated through to the backbone network 902. By providing the reversed gradient to the backbone network 902 during training, the GRL 908 may prevent the backbone network 902 from becoming over trained on any single dataset.

In some embodiments, the domain classifier 910 and/or the class conditional domain classifier 912 may act as part of a feedback network during training to prevent the backbone network from becoming over trained on one specific type of facial spoof attack. The domain classifier 910 may learn features that discriminate between different types of training datasets (herein, different "domains") by minimizing the domain classification loss during training. The domain classifier 910 may be a shallow neural network designed to learn domain discriminative features (e.g., differentiating features between types of facial datasets). The domain classifier 910 may receive the feature vector 904 as input through the GRL 908 and output a scalar value. In some embodiments, a sigmoid function may be applied to the output scalar value in order to produce a domain classifier score between 0 and 1. The domain classifier score may represent a probability of an input training example being from a certain facial dataset. The domain classifier score may be back propagated to the backbone network 902 during training as described in connection to the GRL 908.

In some embodiments, the class conditional domain classifier 912 may also take as input the feature vector 904. The class conditional domain classifier 912 may learn in the opposite manner as the domain classifier 910, instead learning features that make the domains indistinguishable. The class conditional domain classifier 912 may take as input the feature vector 904 during forward propagation. The class conditional domain classifier 912 may pass the feature vector 904 through one or more linear transformation layers, ReLU layers, and/or dropout layers. The outputs of these layers are then passed to "live" and "spoof" heads, which may also be linear transformation layers. The live and spoof heads may output two score vectors, each comprising scores that the input image belongs to each domain (e.g., the different kinds of facial datasets and/or live). These score vectors may be passed back as feedback to the backbone network 902 during backpropagation.

In combination, the domain classifier 910 and the class conditional domain classifier 912 may balance the training of the backbone network 902 so that the backbone network 902 does not become over trained on any one domain. The backbone network 902 may, during training, maximize a domain classification loss vector until a balance between the domain discriminator network (e.g., the domain classifier 910 and/or the class conditional domain classifier 912) and the backbone network is reached.

Figure 10:
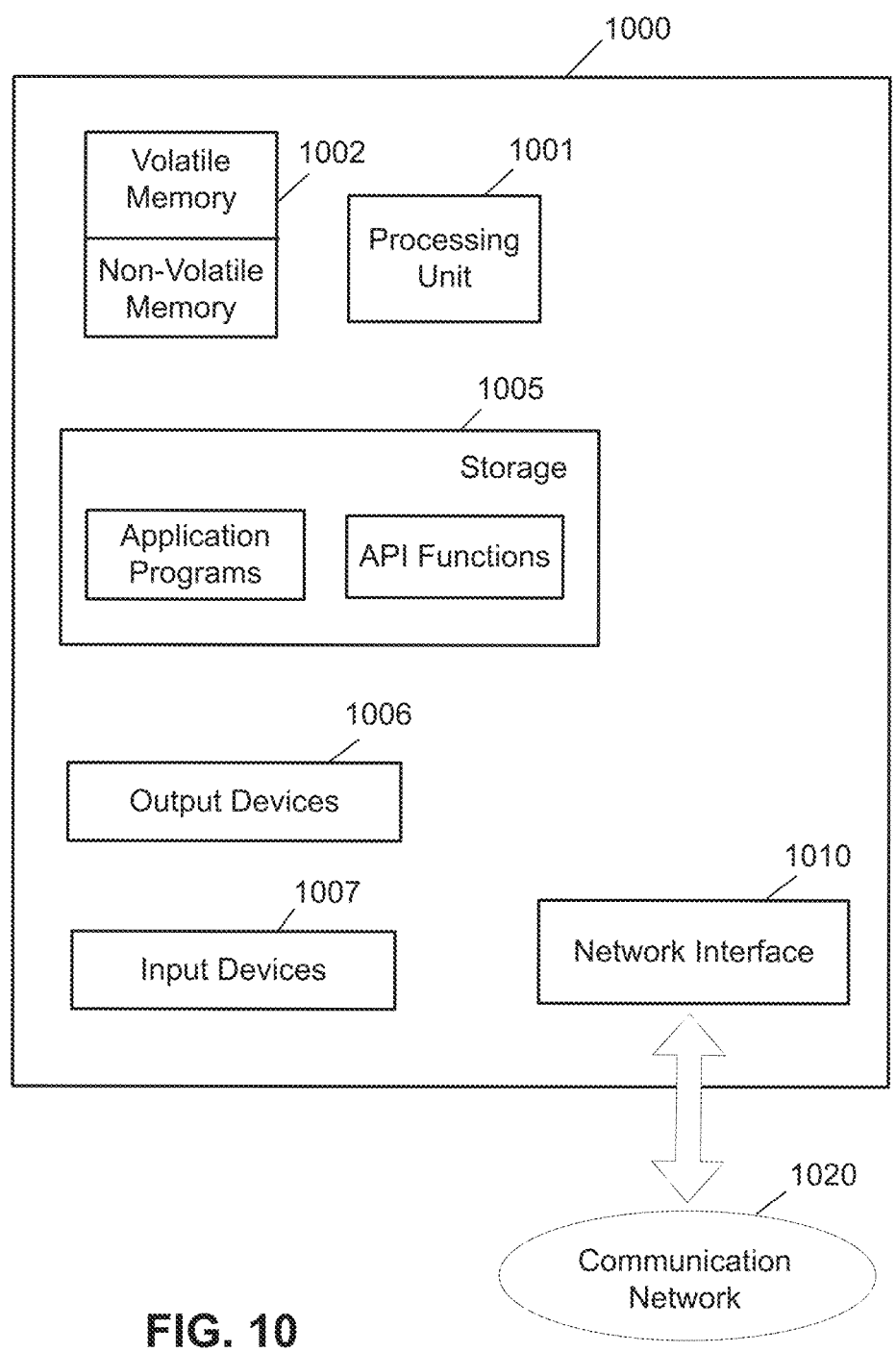
FIG. 10 depicts, schematically, an illustrative computing device on which any aspect of the present disclosure may be implemented.

FIG. 10 shows, schematically, an illustrative computer 1000 on which the methods described above may be implemented. Illustrative computer 1000 may represent an end-user device (e.g., end-user device 106) and/or a remote server (e.g., remote server 110). The computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 10. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1007 may include a microphone for capturing audio signals, and the output devices 1006 may include a display screen for visually rendering, and/or a speaker for audibly rendering, recognized text.

In the example shown in FIG. 10, the computer 1000 also includes one or more network interfaces (e.g., the network interface 1010) to enable communication via various networks (e.g., the network 1020). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one non-transitory computer-readable medium comprising computer-executable instructions which, when executed by a computing device, cause the computing device to carry out a method, the method comprising:
   capturing a plurality of images using a camera; and
   analyzing the captured plurality of images by:
      recognizing images of the plurality of images as images of an identification document;
      computing an angle of the camera relative to the identification document for the recognized images of the plurality of images;
      identifying at least one security feature of the identification document based on the recognized images taken at multiple angles; and
      verifying validity of the at least one security feature based on the recognized images taken at multiple angles.

2. The at least one non-transitory computer-readable medium of claim 1, wherein capturing a plurality of images using a camera comprises:
   providing instructions to a user indicating at what angles the camera of the computing device should be held relative to the identification document.

3. The at least one non-transitory computer-readable medium of claim 1, wherein recognizing images of the plurality of images as images of an identification document comprises:
  processing images of the captured plurality of images captured by identifying regions of the images comprising an identification document; and
  comparing identified regions of the images to images of known identification documents.

4. The at least one non-transitory computer-readable medium of claim 3, wherein computing the angle of the camera relative to the identification document comprises:
  determining locations of marker features of the identification document based on images of known identification documents; and
  projecting the marker features of the identification document onto an image plane of the camera for each image of the plurality of images.

5. The at least one non-transitory computer-readable medium of claim 3, wherein recognizing images of the plurality of images as images of an identification document further comprises:
  identifying a least one security feature as a hologram based on the images of known identification documents.

6. The at least one non-transitory computer-readable medium of claim 5, wherein verifying validity of the at least one security feature comprises:
  comparing an intensity value of each pixel of the identified regions with an intensity value of each pixel of an identified region of a mean image, the mean image being an image formed by averaging the plurality of images.

7. The at least one non-transitory computer-readable medium of claim 3, wherein recognizing images of the plurality of images as images of an identification document further comprises:
  identifying at least one security feature as being a lenticular feature comprising at least one of a lenticular image and lenticular text.

8. The at least one non-transitory computer-readable medium of claim 7, wherein verifying validity of the at least one security feature comprises:
  using template matching methods to determine validity of the lenticular image.

9. The at least one non-transitory computer-readable medium of claim 7, wherein verifying validity of the at least one security feature comprises:
  identifying a region around the lenticular text;
  processing the region of at least one of the images of the plurality of images using binarization methods; and
  extracting text from at least one processed region.

10. A computing device, comprising:
  a camera;
  at least one processor; and
  at least one non-transitory computer-readable medium comprising instructions which, when executed by the at least one processor, cause the computing device to perform a method of:
  capturing a plurality of images using the camera; and
  analyzing the captured plurality of images by:
    recognizing images of the plurality of images as images of an identification document;
    computing an angle of the camera relative to the identification document for the recognized images of the plurality of images;
    identifying at least one security feature of the identification document based on the recognized images taken at multiple angles; and
    verifying validity of the at least one security feature based on the recognized images taken at multiple angles.

11. The computing device of claim 10, wherein capturing a plurality of images using a camera comprises:
  providing instructions to a user indicating at what angles the camera of the computing device should be held relative to the identification document.

12. The computing device of claim 10, wherein recognizing images of the plurality of images as images of an identification document comprises:
  providing instructions to a user indicating at what angles the camera of the computing device should be held relative to the identification document;
  processing images of the plurality of images captured by the user by identifying regions of the images comprising an identification document; and
  comparing the identified regions of the images to images of known identification documents.

13. The computing device of claim 12, wherein the images of known identification documents are stored remotely.

14. The computing device of claim 12, wherein computing the angle of the camera relative to the identification document comprises:
  determining locations of marker features of the identification document based on the images of known identification documents; and
  projecting the marker features of the identification document onto an image plane of the camera for each image of the plurality of images.

15. The computing device of claim 14, wherein determining the angle of the image plane of the camera relative to the plane of the identification document further comprises:
  determining a projection of pre-defined marker features of the identification document onto the image plane of the camera.

16. The computing device of claim 12, wherein recognizing images of the plurality of images of an identification document further comprises:
  identifying a least one security feature as a hologram based on the images of known identification documents.

17. The computing device of claim 16, wherein verifying validity of the at least one security feature comprises:
  comparing an intensity value of each pixel of the identified regions with an intensity value of each pixel of an identified region of a mean image, the mean image being an image formed by averaging the plurality of images.

18. The computing device of claim 12, wherein recognizing images of the plurality of images of as images of an identification document further comprises:
  identifying at least one of the security features as being a lenticular feature comprising at least one of a lenticular image and lenticular text.

19. The computing device of claim 18, wherein verifying validity of the at least one security feature further comprises:
  identifying a region around the lenticular text;
  processing the region of at least one of the images of the plurality of images using binarization methods; and
  extracting text from at least one processed region.

20. The computing device of claim 10, wherein the method further comprises using the at least one processor to identify a plurality of images as comprising at least one of images of a live user and images of a spoof attack.

21. The computing device of claim 20, wherein identifying a plurality of images as comprising at least one of images of a live user and images of a spoof attack comprises:

accessing a plurality of images comprising a face obtained by a camera;

providing the plurality of images to a trained deep learning model to obtain output indicating one or more likelihoods that the plurality of images comprise images of a live user and one or more likelihoods that the plurality of images comprise images of a spoof attack; and identifying the plurality of images as comprising at least one of a live user and a spoof attack based on the output obtained from the trained deep learning model.

22. The computing device of claim 21, wherein the trained deep learning model comprises at least one convolutional neural network and at least one feedback network.

23. The computing device of claim 22, wherein the trained deep learning model is trained based on any one of:

training data built from facial depth features created by a three-dimensional morphable face model;

training data built from facial feature locations; and feedback from the at least one feedback network.

24. The computing device of claim 21, wherein the trained deep learning model is configured to identify spoof attacks including pre-recorded videos comprising a face, still images comprising a face, and live users wearing a mask.

25. The at least one non-transitory computer-readable medium of claim 4, wherein computing the angle of the camera relative to the identification document further comprises determining a transformation matrix describing a transformation between a coordinate system of the identification document and a coordinate system of the camera.

26. The at least one non-transitory computer-readable medium of claim 1, further comprising determining, based on the computed angle of the camera relative to the identification document, whether images of the recognized images were captured at suitably different angles to enable verification of the at least one security feature.

* * * * *